United States Patent [19]
Okano

[11] Patent Number: 5,225,985
[45] Date of Patent: Jul. 6, 1993

[54] VEHICLE SAFETY DEVICE ACTUATING APPARATUS WITH ADAPTIVE REFERENCE LEVEL

[75] Inventor: Masami Okano, Higashimatsuyama, Japan

[73] Assignee: Diesel Kiki Co., Ltd., Tokyo, Japan

[21] Appl. No.: 850,160

[22] Filed: Mar. 13, 1992

Related U.S. Application Data

[63] Continuation of Ser. No. 473,561, Jan. 19, 1990, abandoned.

[30] Foreign Application Priority Data

Jan. 24, 1989 [JP] Japan .................................... 1-13041

[51] Int. Cl.⁵ ............................................. B60R 21/32
[52] U.S. Cl. ................................ 364/424.05; 280/735; 180/282
[58] Field of Search ...................... 280/728, 734, 735; 180/232, 271, 282, 274; 364/424.01, 424.05; 307/10.1, 10.6, 10.7

[56] References Cited

U.S. PATENT DOCUMENTS

| | | | |
|---|---|---|---|
| 3,851,305 | 11/1974 | Baba et al. | 180/274 |
| 3,911,391 | 10/1975 | Held et al. | 280/735 |
| 4,497,025 | 1/1985 | Hannoyer | 280/735 X |
| 4,638,179 | 1/1987 | Mattes et al. | 280/735 X |
| 4,836,024 | 6/1989 | Woehrl et al. | 280/735 X |
| 4,985,835 | 1/1991 | Sterler et al. | 364/424.05 |
| 5,067,745 | 11/1991 | Yoshikawa | 280/735 |
| 5,068,793 | 11/1991 | Condne et al. | 364/424.05 |
| 5,081,587 | 1/1992 | Okano | 364/424.05 |
| 5,173,614 | 12/1992 | Woehrl et al. | 180/282 X |

Primary Examiner—Thomas G. Black
Assistant Examiner—Thomas S. Auchterlonie
Attorney, Agent, or Firm—Pollock, Vande Sande & Priddy

[57] ABSTRACT

In a control apparatus for actuating a vehicle safety device in response to the specific change in the magnitude of acceleration/deceleration of the vehicle which occurs upon a collision, the output signal from the acceleration/deceleration sensor is processed to obtain detected vehicle speed data relating to the running speed of the vehicle, and the maximum value of a positive-going peak in the change in the detected vehicle speed data is detected to determine a reference level used for discriminating the occurrence of collision. The magnitude of the detected vehicle speed data is compared with the reference level, whereby it is discriminated whether or not a collision has occurred on the basis of the condition of the change in the detected vehicle speed.

7 Claims, 2 Drawing Sheets

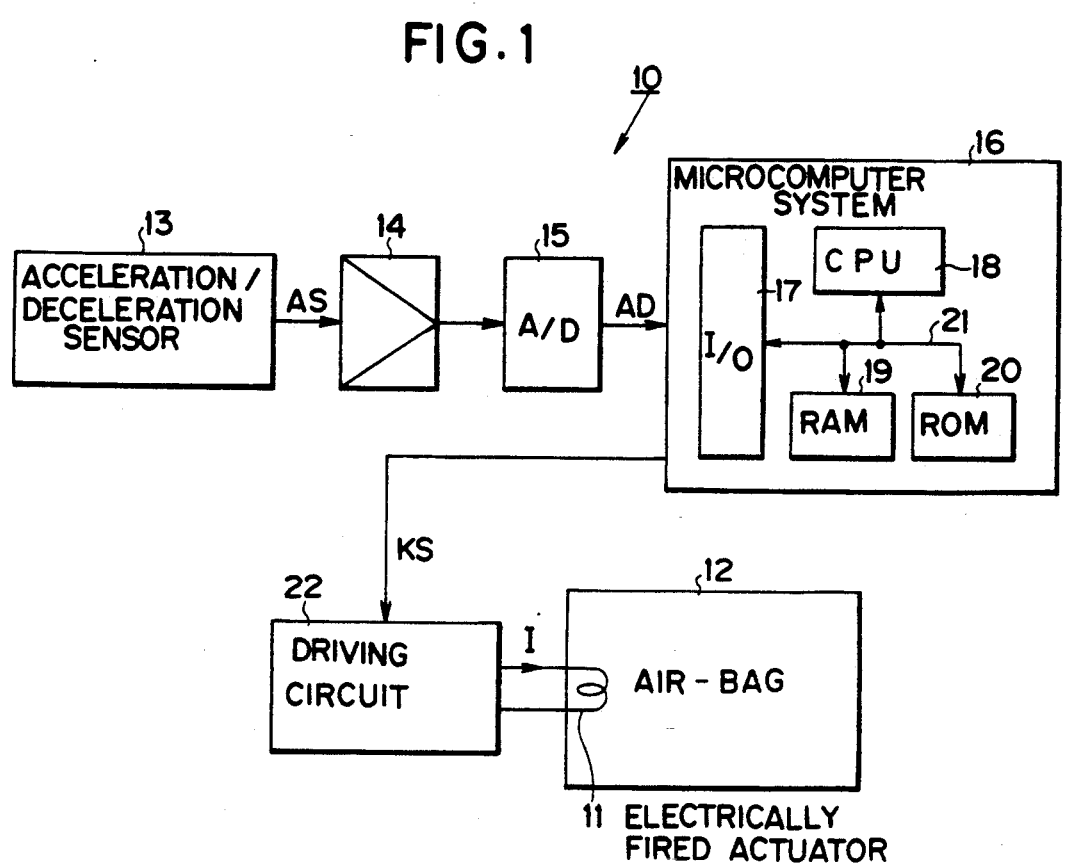
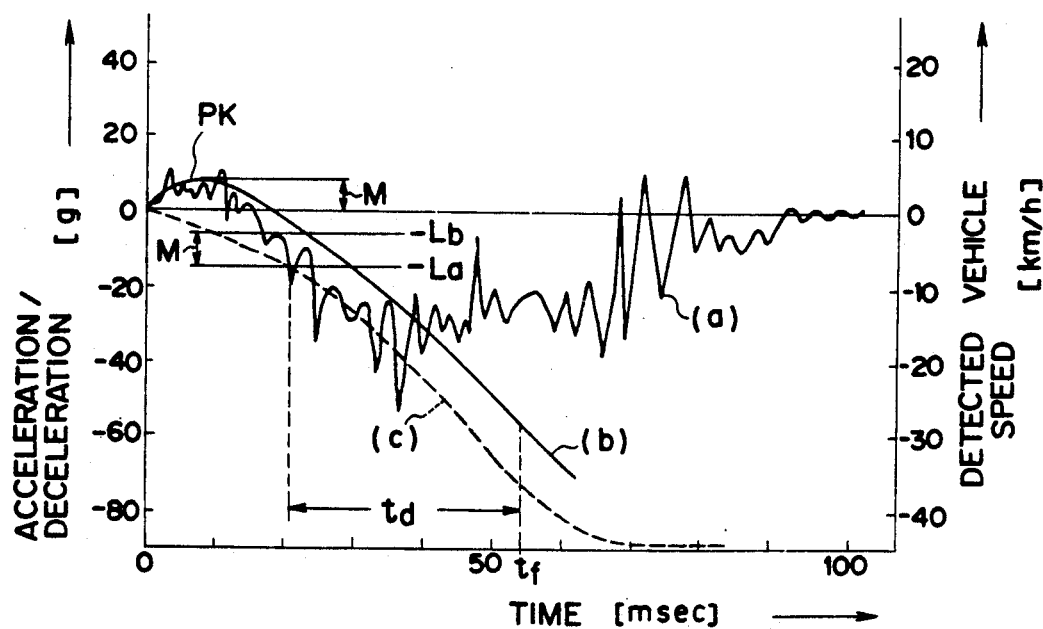

VEHICLE SAFETY DEVICE ACTUATING APPARATUS WITH ADAPTIVE REFERENCE LEVEL

This is a continuation of application Ser. No. 07/473,561 filed Jan. 19, 1990 now abandoned.

BACKGROUND OF THE INVENTION

1. Field of the Invention

The present invention relates to a control apparatus for actuating vehicle safety devices such as an air-bag, a safety belt tightening device and the like in a motor vehicle.

2. Description of the Prior Art

For ensuring the safety of motor vehicle passengers, there have been developed various vehicle safety devices such as air-bag, the safety belt tightening devices and the like. For these devices to work effectively, it is necessary to detect when a collision has occurred as soon as possible in the prior art and there have been proposed various devices for meeting requirement.

For example, Japanese Patent Application Public Disclosure No. Sho 49-55031 discloses a conventional device in which the output from a deceleration sensor is integrated when the output level of the deceleration sensor exceeds a predetermined level to obtain information concerning the vehicle speed thereafter and it is determined that the vehicle has collided with an obstruction when the decrease in the vehicle speed reaches a prescribed level. Thus, in the conventional device, the operation necessary for ensuring the safety of the operator and passengers of the motor vehicle is actuated in response to the detection of collision.

It is generally said that a safety device can effectively protect the car occupants only if it can limit the maximum displacement of the occupants, especially their heads, to within fifteen to twenty centimeters at the time of collision. Accordingly, considering that it takes approximately thirty milliseconds from the time of the actuation of an electrically fired actuator for, for example, an air-bag, to the time of the completion of the expansion thereof, it is necessary to decide whether or not a collision has occurred within twenty to twenty-five milliseconds after it happens. The conventional control apparatus of this kind is of course designed in consideration of this fact to perform the appropriate triggering operation for the electrically or mechanically fired actuator.

However, actual collisions can occur in many ways that make it very difficult for the conventional control apparatus to assuredly detect the occurrence of the collision within the required period of time. The difficulty arises because, in the conventional apparatus the discrimination as to whether a collision has occurred is based on whether the integrated value of the deceleration of the motor vehicle has reached a predetermined level. However, collisions are not always simple events, for example, the motor vehicle may firstly be accelerated forward in a rear-end collision and be decelerated when it collides with another vehicle in front. Therefore, in the conventional apparatus wherein the occurrence of a collision is discriminated by the fact that the degree of deceleration of the vehicle has reached the predetermined level, it follows that there will sometimes be a long interval between the time of the collision condition and the time the degree of the deceleration of the vehicle reaches the predetermined level. This is particularly true where the vehicle is momentarily accelerated at the occurrence of the collision. Accordingly, in such a case, there is no assurance of being able to detect the occurrence of the collision within the predetermined time period required for assuring the safety of the car occupants.

SUMMARY OF THE INVENTION

It is therefore an object of the present invention to provide an improved control apparatus for actuating vehicle safety devices.

It is another object of the present invention to provide an apparatus for actuating vehicle safety devices which is capable of assuredly detecting the occurrence of a collision within the period of time required for ensuring the protection of the vehicle occupants.

It is a further object of the present invention to provide a control apparatus for actuating vehicle safety devices with high reliability.

According to the present invention, in a control apparatus for actuating a vehicle safety device which comprises an acceleration/deceleration sensing means for sensing the magnitude of acceleration/deceleration of the vehicle and a signal processing means for processing the output from the acceleration/deceleration sensing means to obtain detected vehicle speed data relating to the running speed of the vehicle, the control apparatus further comprises a first means responsive to the signal processing means for detecting a value of a positive-going peak in the change in the detected vehicle speed data, a second means responsive to the first means for determining a reference level used for discriminating the occurrence of collision, and a third means for comparing the magnitude of the output from the signal processing means with the reference level, whereby it is discriminated whether or not a collision has occurred on the basis of the condition of the change in the detected vehicle speed.

The control apparatus according to the present invention can be employed for controlling the actuation of an air-bag or the like and can use as the acceleration/deceleration sensing means a conventional vehicle acceleration sensor of a type of well-known design for detecting the magnitude of the change in the running speed of a vehicle per unit time. The acceleration/deceleration sensing means is mounted properly on the vehicle to produce an output indicating the magnitude of the acceleration/deceleration of the vehicle.

In the case where the magnitude of the acceleration/deceleration of the vehicle has exceeded a limit level which is not exceeded in the normal running condition of the vehicle, the sensing output produced thereafter is subjected to the integrating operation by the signal processing means to produce a signal or data showing the running speed of the vehicle. In the following description the running speed of the vehicle shown by the signal or data obtained by a signal processing operation will be referred to as the detected vehicle speed so as to be distinguishable from the actual running speed of the vehicle.

The level of the detected vehicle speed is compared with the reference level supplied from the second means by the third means to discriminate whether or not a collision has occurred.

The reference level may be determined by the second means as in the following example. At first, a basic reference level is determined, which is for the condition where the vehicle simply collides with an obstacle in front, such as a wall or the like. That is, similarly to the conventional system, in order to complete the necessary operation of the vehicle safety device before the displacement of the head occupant(s) of the vehicle occupant(s) has reached an allowable maximum magnitude, such as 10 to 15 (cm), as is required for ensuring their protection, assuming that the delay from the time of triggering of the vehicle safety device to the completion of the necessary operation of the vehicle safety device is $t_d$ and the head of the occupant(s) is displaced by the allowable maximum distance after the passage of time $t_f$ from the occurrence of the collision, the level $-L_a$ of the detected vehicle speed after the passage of time $t_f - t_d$ from the occurrence of the collision is determined as the basic reference level.

This level $-L_a$ is stored as the basic reference level in the second means, and the basic reference level is corrected on the basis of the peak value of the positive-going peak detected by the first means. For example, this correction is made by adding the peak value level M to the basic reference level $-L_a$ to obtain the adaptive reference level $-L_b$.

When the level indicated by the signal output from the signal processing means becomes lower than the reference level $-L_b$, the vehicle safety device is actuated to perform the operation necessary for protecting the occupant(s).

With this constitution of the present invention, in the case where the vehicle collides with a forward obstruction without a rear-end collision, the adaptive reference level $-L_b$ is equal to the basic reference level $-L_a$ since no positive-going peak occurs and the vehicle is decelerated quickly to decrease the detected vehicle speed. The vehicle safety device is thus actuated when the level of the detected vehicle speed becomes less than the basic reference level $-L_a$, and the desired operating condition of the vehicle safety device is established after the time $t_d$. The reference level is determined as described above in consideration of the time delay $t_d$, so that the required protection is established before the displacement of the head of the occupant(s) exceeds the allowable maximum distance so that the driver and passengers can be reliably protected.

On the other hand, in the case of a rear-end collision, for example, the vehicle is firstly accelerated to produce a positive-going peak in the detected vehicle speed and the peak value of the positive-going peak is detected by the first means. Consequently, the basic reference level $-L_a$ is corrected, for example, by the peak value to obtain the adaptive reference level $-L_b (\geq -L_a)$. Since the vehicle speed is then decelerated by colliding with the forward obstruction after this, the level of the detected vehicle speed becomes lower and reaches the level $-L_a$. In this case, the time from the occurrence of the collision to the time the detected vehicle speed reaches the level $-L_a$ is more than that in the former case. However, the vehicle safety device is actuated prior to the time the detected vehicle speed reaches the basic reference level $-L_a$ because the adaptive reference level $-L_b (\geq -L_a)$ is used to determine the time of the start of the actuation of the vehicle safety device. As a result, excessive displacement of the head of the occupant(s) can be effectively prevented even in the case of, for example, a rear-end collision.

The invention will be better understood and other objects and advantages thereof will be more apparent from the following detailed description of preferred embodiments with reference to the accompanying drawings.

BRIEF EXPLANATION OF THE DRAWINGS

FIG. 1 is a block diagram showing an embodiment of a control apparatus for an inflatable air cushion according to the present invention;

FIG. 2 is a graph showing an example of the changes in the acceleration/deceleration of a vehicle and the corresponding detected vehicle speed in a collision, for explaining the operation of the control apparatus shown in FIG. 1;

DESCRIPTION OF THE PREFERRED EMBODIMENT

Figure 3:
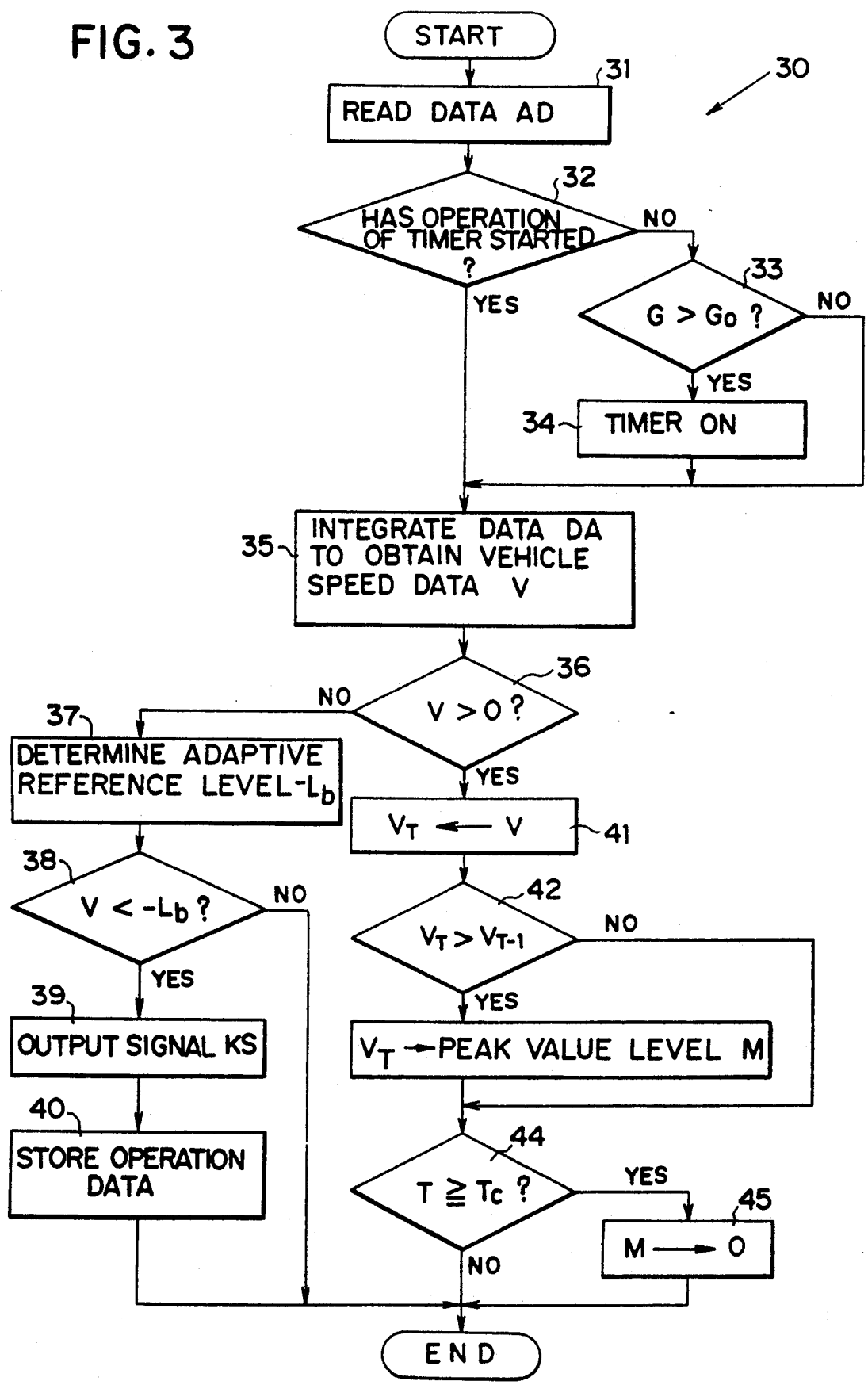
FIG. 3 is a flowchart showing the control program executed in the control apparatus shown in FIG. 1.

Referring now to the drawings and initially to FIG. 1, there is shown a control apparatus 10 for controlling the actuation of an electrically fired actuator 11 provided in an air-bag 12 which is mounted on a vehicle (not shown). The control apparatus 10 has an acceleration/deceleration sensor 13 for sensing the magnitude of the acceleration/deceleration of the vehicle, which may be the conventional vehicle acceleration sensor of well-known design for detecting the magnitude of the positive/negative change in the running speed of the vehicle per unit time.

The acceleration/deceleration sensor 13 produces an output signal AS showing the magnitude of the acceleration/deceleration of the vehicle at each moment, and the output signal AS is amplified by an amplifier 14. The amplified output signal from the amplifier 14 is input to an analog-digital converter (A/D) 15 to change it into digital form to obtain digital acceleration/deceleration data AD corresponding to the output signal AS.

The acceleration/deceleration data AD is supplied to a microcomputer system 16 which has an input/output device (I/O) 17, a central processing unit (CPU) 18, a random access memory (RAM) 19 and read-only memory (ROM) 20, which are interconnected by a bus 21. A control program is stored in the ROM 20 and the acceleration/deceleration data AD is processed in accordance with the control program stored in the ROM 20 to discriminate whether or not a collision has occurred. When occurrence of a collision is discriminated as the result of the data processing according to the control program, an actuating signal KS is supplied from the microcomputer system 16 to a driving circuit 22. The driving circuit 22 provides an actuating current I to the electrically fired actuator 11 upon the receipt of the driving signal KS to expand the air-bag 12.

A detailed description of the control carried out by the microcomputer system 16 will be given in conjunction with FIGS. 2 and 3.

The control program 30 stored in the ROM 20 is executed at predetermined time intervals. A flowchart showing the control program 30 is shown in FIG. 3. After the start of the execution of the control program 30, the operation moves to step 31 in which the acceleration/deceleration data AD is read in. Then, the operation moves to step 32 in which discrimination is made as to whether or not the operation of a timer has started. Since the operating of the timer has not started yet at this time, the determination in step 32 becomes NO and the operation moves to step 33.

In step 33 discrimination is made as to whether or not the discrimination of collision based on the acceleration/deceleration data AD should be executed. The discrimination in step 33 is executed in such a way that the absolute value G of the acceleration/deceleration of the vehicle indicated by the acceleration/deceleration data AD is compared with a predetermined level $G_o$. The predetermined level $G_o$ is determined as a level never incurred in normal operation of the vehicle, but incurred in the case of collision. The determination in step 33 becomes YES when $G > G_o$ and the operation moves to step 34 in which the operation of the timer is started. After this, the operation moves to step 35 in which the acceleration/deceleration data DA is integrated to obtain vehicle speed data V showing the detected vehicle speed. On the other hand, the operation moves to step 35 without the execution of step 34 when $G \leq G_o$ in step 33.

FIG. 2 is a graph showing an example of the change in the acceleration/deceleration of the vehicle detected by the acceleration/deceleration sensor 13 in the case where the vehicle in firstly accelerated by a rear-end collision and then collides with a forward obstruction. In this graph, time t is plotted along the abscissas and the curve (a) shows the change in the acceleration/deceleration of the vehicle. Furthermore, the curve (a) starts at t=0 where the magnitude of G has become more than the level $G_o$, and the integration operation in step 35 also starts at t=0 to obtain the vehicle speed data V. The detected vehicle speed shown by the vehicle speed data V is shown by a curve (b) in FIG. 2.

As will be understood from FIG. 2, in this example, the vehicle is firstly accelerated and is then decelerated as shown by the curve (a). Accordingly, a sudden decrease in vehicle speed occurs after the initial increase in the vehicle speed.

Returning to FIG. 3, in step 36 discrimination is made as to whether or not the detected vehicle speed shown by the data V is a positive value. Since $V > 0$ at first in the case shown in FIG. 2, the operation moves to step 41. However, the operation moves to step 37 when the vehicle collides with a forward obstruction without a rear-end collision because the detected vehicle speed obtained in step 35 does not become positive in such a collision.

An explanation will be given of steps 41 to 43 which serve to determine the peak value data M of the positive-going peak of the curve (b). In step 41 the data V at this time is stored as data $V_T$ in the RAM 19. After this, in step 42 the data $V_T$ is compared with data $V_{T-1}$ which was stored in the preceding program cycle and shows the data V at the proceeding program cycle. When $V_T > V_{T-1}$, the operation moves to step 43 wherein the data $V_T$ is set as the peak value data M and the operation moves to step 44. In contrast, when $V_T < V_{T-1}$, the determination in step 42 becomes NO and the operation moves to step 44 without the execution of step 43. As a result, the peak value of the positive-going peak of the curve (b) can be obtained and stored as peak value data M.

In step 44 discrimination is made as to whether or not the content T of the timer has reached a prescribed value $T_c$. The value $T_c$ is set larger than the time from the start of a collision to the completion of the crash. For example, it is set to 200 milliseconds. Thus, in the case where the content T of the timer has reached $T_c$, the determination in step 44 becomes YES and the peak value data M is set to zero in step 45. After this, the operation of this program cycle is terminated. When the content T of the timer has not reached $T_c$, the determination in step 44 becomes NO and the operation of this program cycle is terminated without the execution of step 45. The execution of the control program 30 is started again after a predetermined time period.

When the data v is not positive, the determination in step 36 becomes NO to move the operation to step 37 in which a reference level $-L_b$ is determined in accordance with the following formula in this embodiment.

$$-L_b = -L_a + M \qquad (1)$$

The reference level $-L_b$ is used for determining whether or not a collision has occurred and is determined on the basis of a basic reference level $-L_a$ and the peak value data M obtained in step 43.

The basic reference level $-L_a$ is determined as follows. The basic reference level is determined for the condition where the vehicle simply collides with a forward obstruction, such as a wall. That is, in order to complete the necessary operation of the inflatable air cushion 12 before the displacement of the head of the occupant(s) has reached a predetermined allowable maximum distance required for ensuring their protection, assuming that the delay time from the time of the production of the actuating signal KS to the complete expansion of the inflatable air cushion 12 is $t_d$ and the head of the occupant(s) is displaced by the predetermined allowable maximum distance after the passage of time $t_f$ from the occurrence of the collision, the level of the detected vehicle speed at the passage of time $t_f - t_d$ from the time of the collision is determined as the basic reference level $-L_a$. In FIG. 2, the curve of the detected vehicle speed used for determining the basic reference level $-L_a$ is shown as a curve (c).

That is, as will be understood from FIG. 2, if the electrically fired actuator 11 is triggered when the level of the detected vehicle speed shown by the curve (c) is lowered to the level $-L_a$, the inflatable air cushion 12 will be completely expanded at the time $t_f$ to fully protect the occupant(s) from the shock. In the case where the vehicle is firstly accelerated by the collision, the basic reference level $-L_a$ is corrected by the amount of the data M to obtain the corrected reference level $-L_b$. In contrast, the basic reference level $-L_a$ is equal to the reference level $-L_b$ since M=0 in the case of a simple collision.

After the determination of the reference level $-L_b$, the operation moves to step 38 in which discrimination is made as to whether or not the level of the data V is less than the reference level $-L_b$. The execution of the control program 30 is terminated when $V \geq -L_b$. In contrast, the determination in step 38 becomes YES when $V < -L_b$, and the operation moves to step 39 wherein the actuating signal KS is produced to actuate the electrically fired actuator 11. After this, the operation moves to step 40 wherein the operation data, for example, the reference level data, the detected vehicle data and the like are stored in the RAM 19. This makes it possible to confirm the conditions of the collision later. The execution of the control program 30 is terminated by the execution of step 40.

According to the arrangement described above, the timer is triggered when the absolute value G indicating the acceleration/deceleration of the vehicle based on the data AD becomes more than the predetermined level $G_o$, and the integrating operation for the data AD is carried out to obtain the vehicle speed data V showing the detected vehicle speed. In the case where the vehicle is firstly accelerated just after the occurrence of the collision, such as in a rear-end collision, the data processing operation for obtaining the peak value data M concerning the positive-going peak of the detected vehicle speed is carried out in steps 41 to 43.

After this, the value of the reference level $-L_b$ is determined in consideration of the data M in step 37 when the detected vehicle speed becomes negative, and discrimination is made as to whether or not a collision has occurred by comparing the data V with the reference level $-L_b$ in step 38.

The actuating signal KS is generated to actuate the electrically fired actuator 11 when a collision condition is detected, and the inflatable air cushion 12 is completely expanded within the predetermined delay time $t_d$ to protect the occupant(s). In this case, the reference level $-L_b$ is corrected by data M in the manner described above and the inflatable air cushion 12 is completely expanded within the required time period $t_f$ after the collision even if the vehicle is initially accelerated in the collision as in the case of a rear-end collision.

The reference level $-L_b$ may be determined in various ways other than the manner described above.

I claim:

1. A control apparatus for actuating a safety device in a vehicle, said control apparatus comprising:
   acceleration/deceleration sensing means for sensing the magnitude of acceleration/deceleration of the vehicle and producing an output signal showing this magnitude;
   signal processing means for integrating the output signal to obtain detected vehicle speed data representing detected vehicle speed;
   first means responsive to said signal processing means for detecting a value of a positive-going peak in a change in the detected vehicle speed data;
   reference means for providing a basic reference level data for discrimination of a vehicle collision in the case where the vehicle collides with only an obstacle in front;
   second means responsive to said first means and said reference means for determining a reference level data for discriminating the occurrence of a vehicle collision by changing the basic reference level data in accordance with the value of the positive-going peak;
   third means for comparing the detected vehicle speed data with the reference level data to determine whether or not a vehicle collision has occurred;
   means responsive to said third means for generating an actuating signal when a collision has occurred;
   an actuator for actuating the vehicle safety device; and,
   a driving circuit responsive to the actuating signal for causing said actuator to actuate the vehicle safety device.

2. An apparatus as claimed in claim 1 wherein an integration operation for integrating the output signal from said acceleration/deceleration sensing means is started when the magnitude of acceleration/deceleration of the vehicle exceeds a predetermined level.

3. An apparatus as claimed in claim 2 wherein the predetermined level is determined as a level never incurred in normal running operation of the vehicle but incurred in the case of collision.

4. An apparatus as claimed in claim 1, wherein the value of the positive-going peak is corrected in accordance with the vehicle running speed.

5. An apparatus as claimed in claim 1 wherein the vehicle safety device comprises an air-bag.

6. An apparatus as claimed in claim 5 wherein the vehicle safety device further comprises an actuating means for actuating the air-bag, and the actuating means is triggered by said driving circuit.

7. An apparatus as claimed in claim 1 wherein said second means is arranged to determine the reference level data by adding the value of the positive-going peak to the basic reference level data.

* * * * *